(12) United States Patent
Brändli et al.

(10) Patent No.: US 11,812,169 B2
(45) Date of Patent: Nov. 7, 2023

(54) DYNAMIC VISION SENSOR WITH IN-PIXEL DIGITAL CHANGE DETECTION

(71) Applicant: Sony Advanced Visual Sensing AG, Schlieren (CH)

(72) Inventors: Christian Brändli, Baden (CH); Raphael Berner, Confignon (CH)

(73) Assignee: Sony Advanced Visual Sensing AG, Schlieren (CH)

( * ) Notice: Subject to any disclaimer, the term of this patent is extended or adjusted under 35 U.S.C. 154(b) by 105 days.

(21) Appl. No.: 17/609,437

(22) PCT Filed: May 8, 2020

(86) PCT No.: PCT/IB2020/054399
§ 371 (c)(1),
(2) Date: Nov. 8, 2021

(87) PCT Pub. No.: WO2020/229981
PCT Pub. Date: Nov. 19, 2020

(65) Prior Publication Data
US 2022/0239851 A1   Jul. 28, 2022

Related U.S. Application Data
(60) Provisional application No. 62/846,287, filed on May 10, 2019.

(51) Int. Cl.
*H04N 25/50* (2023.01)
*H04N 25/771* (2023.01)
*H04N 25/772* (2023.01)

(52) U.S. Cl.
CPC .......... *H04N 25/50* (2023.01); *H04N 25/771* (2023.01); *H04N 25/772* (2023.01)

(58) Field of Classification Search
None
See application file for complete search history.

(56) References Cited

U.S. PATENT DOCUMENTS

| | | |
|---|---|---|
| 7,728,269 B2 | 6/2010 | Lichtsteiner et al. |
| 2008/0135731 A1 | 6/2008 | Lichtsteiner et al. |

(Continued)

FOREIGN PATENT DOCUMENTS

| | | |
|---|---|---|
| CN | 108 600 579 A | 9/2018 |
| KR | 2008 0074684 A | 8/2008 |

(Continued)

OTHER PUBLICATIONS

International Preliminary Report on Patentability, dated Nov. 25, 2021, from International Application No. PCT/IB2020/054399, filed on May 8, 2020. 8 pages.

(Continued)

*Primary Examiner* — Mark T Monk
(74) *Attorney, Agent, or Firm* — HoustonHogle LLP

(57) ABSTRACT

A dynamic vision sensor such as an event based vision sensor employs analog to digital converters (ADC), such as ramp ADCs, that analog to digital converts the signals from photoreceptors. Current and previous light values are then stored and compared digitally. In addition, log compression can be implemented by increasing the count linearly while increasing the reference voltage exponentially, or increasing the count logarithmically while increasing the reference voltage linearly.

18 Claims, 13 Drawing Sheets

(56) References Cited

U.S. PATENT DOCUMENTS

| | | | | |
|---|---|---|---|---|
| 2012/0280131 A1* | 11/2012 | Spartiotis | ............... | H04N 5/32 |
| | | | | 250/366 |
| 2015/0304578 A1* | 10/2015 | Okura | ................... | H04N 25/76 |
| | | | | 348/308 |
| 2016/0028974 A1* | 1/2016 | Guidash | .............. | H04N 25/671 |
| | | | | 348/294 |
| 2017/0019103 A1* | 1/2017 | Motz | ...................... | G01P 3/489 |
| 2018/0191972 A1 | 7/2018 | Berner et al. | | |

FOREIGN PATENT DOCUMENTS

| | | |
|---|---|---|
| WO | WO 2018/122800 A1 | 7/2018 |
| WO | WO 2019/018084 A1 | 1/2019 |

OTHER PUBLICATIONS

International Search Report and Written Opinion of the International Searching Authority, dated Jun. 25, 2020, from International Application No. PCT/IB2020/054399, filed on May 8, 2020. 13 pages.

\* cited by examiner

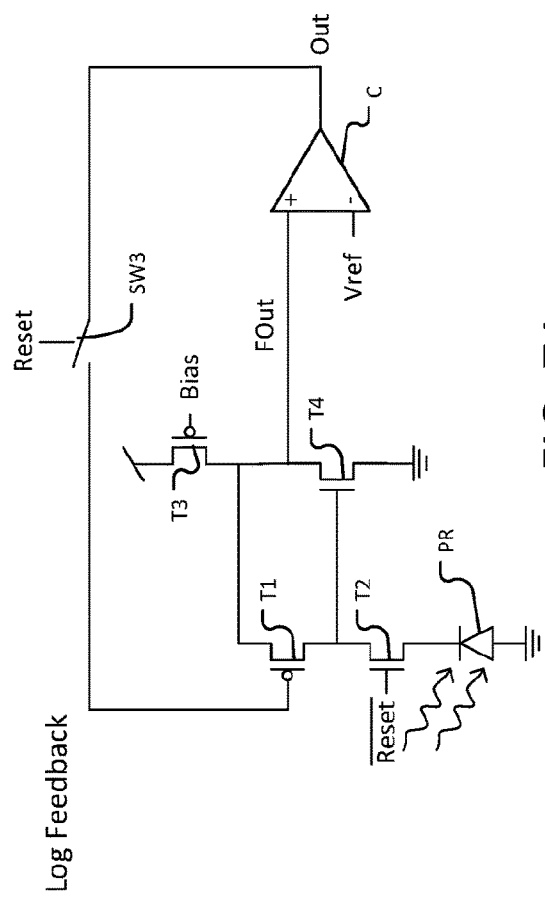
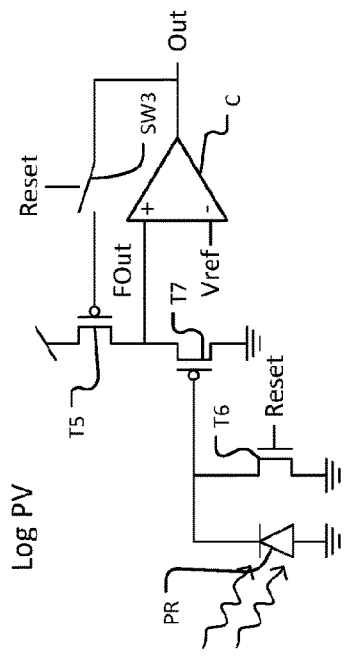
FIG. 7A
FIG. 7B

DYNAMIC VISION SENSOR WITH IN-PIXEL DIGITAL CHANGE DETECTION

RELATED APPLICATIONS

This application is a § 371 National Phase Application of International Application No. PCT/IB2020/054399, filed on May 8, 2020, now International Publication No. WO 2020/229981 A1, published on Nov. 19, 2020, which International Application claims the benefit under 35 USC 119(e) of U.S. Provisional Application No. 62/846,287, filed on May 10, 2019, both of which are incorporated herein by reference in their entirety.

BACKGROUND OF THE INVENTION

Today, machine vision is mostly based on conventional cameras and their associated frame-based, spatially resolved optical sensors. For some machine vision tasks, e.g., object recognition, these conventional frame-based cameras, with their image-based optical sensors, are well suited. However, for other tasks, e.g., monitoring, tracking or position and motion estimation, the conventional image sensors have drawbacks.

The main drawback is that conventional cameras produce a significant amount of redundant and unnecessary data, which has to be captured, communicated and processed. This high data load slows down the reaction time by decreasing temporal resolution, results in increased power consumption, and increases the size and cost of machine vision systems. In addition, most image sensors suffer from limited dynamic range, poor low-light performance and motion blur.

On the other hand, so-called Dynamic Vision Sensors (DVS) overcomes the limitations of frame-based encoding. See U.S. Patent Application Publication No. US 2008/0135731, by Lichtsteiner et al., entitled "Photoarray for Detecting Time-Dependent Image Data", which is incorporated herein by this reference. These spatially-resolved optical sensors are used in-pixel data compression to remove data redundancy. They can also achieve high temporal resolution, low latency, low power consumption, and high dynamic range with little motion blur. The DVS-type of optical sensor is thus well suited, especially for solar or battery powered compressive sensing or for mobile machine vision applications where the position of the system has to be estimated and where processing power is limited due to limited battery capacity.

The DVS pre-processes visual information locally. Instead of generating crisp images, the DVS produces smart data for computer applications. While conventional image sensors capture a movie as a series of still images, the DVS detects and only transmits the position of changes in a scene. It encodes the visual information much more efficiently than conventional cameras because it does so in-pixel data compression. This means that processing of data is possible using less resources, lower net power and with faster system reaction time. The high temporal resolution allows continuously tracking visual features and thereby overcoming the correspondence problem. Additionally, the architecture of DVS allows for high dynamic range and good low-light performance.

Event-based vision sensors (EVBS) are often but not always variants of the original DVS architectures. As a general rule, the pixels of EVBS's operate asynchronously at least in portions of their pixels without a periodic sampling rate and emit a so-called DVS address event as soon as they perceive a luminance change exceeding an adjustable threshold. ON events are associated with an increase in luminance exceeding the threshold; and OFF events are associated with a decrease in luminance exceeding the threshold at a given pixel.

In addition, there are many examples of hybrid spatially-resolved optical sensors. For example, it has been proposed to combine frame-based image sensing with event-based vision sensing into the same array of pixels. Moreover, there are other proposed sensor architectures that provide different combinations of event detection and image sensing.

SUMMARY OF THE INVENTION

Typically, vision sensors capture temporal change events through a combination of several elements all of which can have certain shortcomings in many of the proposed architectures.

Current-domain logarithmic (log) photoreceptors are continuous time circuits. They typically have an additional shot noise source from a feedback transistor in each pixel. They also suffer from a reduced signal to noise ratio (SNR) in low-light conditions compared to conventional image sensors. They also tend to be slow in low light conditions.

The analog memories of these sensors also present design challenges. They suffer from leakage and can consume a relatively large surface area on the sensor die. Moreover, the nature of the memories means that the integrated signal is lost during pixel reset. The magnitude of the event is lost, i.e. amount of change that triggered the event, is unknown.

The in-pixel comparators of the sensors pose problems. They are complex and require many transistors. This impacts the sensors' fill factors.

The present invention can be employed to address some or all of these previously identified issues. It can further facilitate higher pixel densities than some previous designs. Moreover, it can further yield a pixel that allows immediate knowledge of the event magnitude, i.e. the amount of change encoded by one event.

At the same time, stacked CMOS image sensor (CIS) processes allow small feature sizes on the bottom wafer while having a highly light sensitive upper wafer. This cannot really be leveraged by DVS-type architectures, however. The capacitance of metal-insulator-metal (MiM) capacitors common to CMOS processes does not scale with feature size. They thus tend to dominate die area as other circuits shrink. Also, many transistors cannot be scaled to the CMOS process's minimal feature size since matching is important. Moreover, many transistors have to be designed to operate with high supply voltages and thus thick gate oxide layers to have sufficient swing or sufficiently small gate/channel leakage. Also, new CIS processes use highly optimized photoreceptors with full charge transfer to reduce noise, but DVS architectures cannot take advantage of these process advancements because the photodiode is operated in continuous-time.

Some embodiments of the present invention exploit these stacked CIS processes. An optical sensor with a photoreceptor-optimized wafer can "write" its value into a lower digital wafer, in which memory and/or processing is possibly performed. Avoiding the use of some or all of the analog memories avoids leakage and in a stacked CIS process, it potentially allows the pixel to be shrunk.

Two challenges when transitioning to a digital memory are an efficient analog-to-digital conversion scheme and an efficient way compare the current value with the past. The proposed invention can be employed to solve these challenges by using an analog and a digital comparator (CX) in combination with two ramps (analog and digital). This allows it to establish an analog to digital (A-D) conversion in time.

Having a digital memory means that each pixel needs an analog to digital converter (ADC). In some examples, a ramp ADC is employed, which allows A-D conversion of a photoreceptor's signal Vs while at the same time performing a logarithmic (log) compression by increasing the count linearly while increasing the reference voltage exponentially, or increasing the count logarithmically while increasing the reference voltage linearly.

In a such a digital pixel, it is necessary to detect whether an event was triggered, i.e. the change crossed a certain upper (ON) or lower (OFF) threshold since the last value was stored in the memory, by the difference between old illumination value and current illumination value that has to be calculated. To compare the difference between old and current illumination to a threshold, a digital comparator can be used. Then, to update the memory value (pixel reset), the value for the current illumination would be copied into the memory for the old illumination.

In general, according to one aspect, the invention features an optical sensor comprising pixels including photoreceptors for detecting received photons and analog comparators for comparing signals from the photoreceptors to a ramp voltage. Current memories are used for storing current counts that are related to the ramp voltage and old memories store previous counts. One or more digital comparators are then used to compare a difference between the current counts and the previous counts to at least one event threshold.

In embodiments, ON and OFF event digital comparators are used for comparing a difference between the current counts and the previous counts to an ON event threshold and an OFF event threshold.

In addition, the photoreceptors and at least part of the analog comparators can be implemented in a different wafer from the current memory and the old memory. This way, one wafer can be optimized for light detection while the other wafer can be optimized for digital circuitry.

In addition, there are different options for whether components are implemented in each pixel or shared between pixels of a column. For example, at least some of the memories are often located in each pixel. In addition, digital subtractors for determining a difference between the current counts and the previous counts can be located in each pixel or located in readout circuits and shared between pixels.

Often, the ramp voltage varies exponentially over time.

In general, according to another aspect, the invention features an optical sensing method comprising detecting received photons and comparing resulting signals to a ramp voltage, storing current counts that are related to the ramp voltage, storing previous counts, and comparing a difference between the current counts and the previous counts to at least one event threshold.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 7A is a circuit diagram first logarithmic pixel front end;

FIG. 7B is a circuit diagram for a second pixel front end using a photovoltaic configuration;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
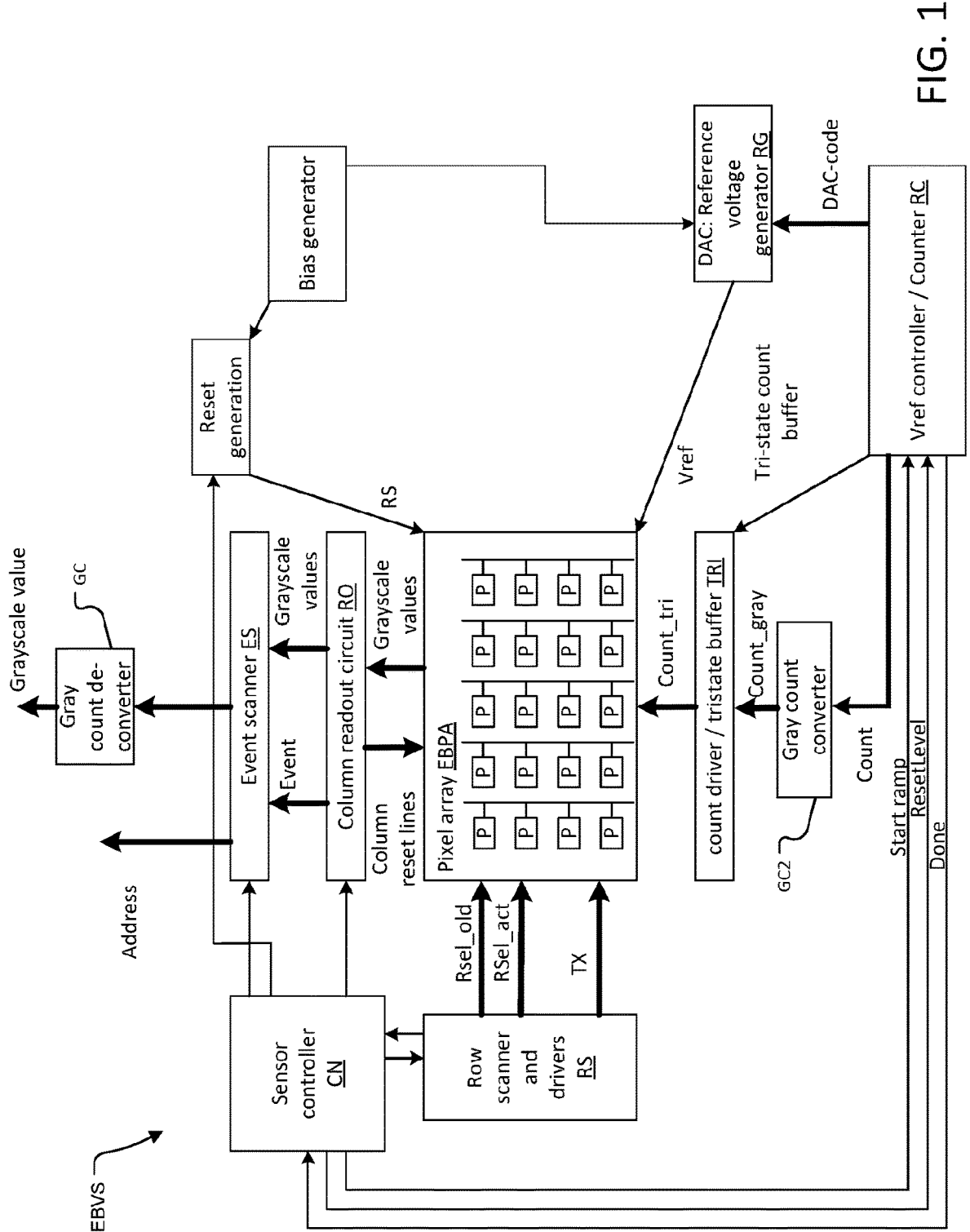
FIG. 1 is a schematic block diagram showing a dynamic vision sensor such as an event-based vision sensor EBVS with its event-based pixel array EBPA.

FIG. 1 shows the basic lay-out of a dynamic vision sensor such as an event-based vision sensor EBVS.

It has an event-based pixel array EBPA and column read-out circuitry RO that reads the events generated by the array EBPA along with grayscale values for each pixel.

The EBPA is usually a two-dimensional, spatially-resolved array of pixels P. Often the array has more than 100 columns and more than 100 rows. In one example, this readout is row-wise as controlled by a row scanner and drivers circuit RS. A sensor controller CN coordinates the operation of the sensor EBVS and typically controls an event scanner ES to provide an event data stream in the form of pixel addresses along with gray scale values, potentially via a gray count deconverter GC, to another a processing unit (e.g. central processing unit (CPU), microcontroller, digital signal processor (DSP)). The gray count deconverter GC may be a separate block such as drawn in FIG. 1, or it may be a part of the column readout circuit RO, or it may be completely omitted. Often the event data stream in the form of the addresses of the pixels P that detected a light change. Each of these addresses encodes the position of a pixel in the array, in the form of two numbers representing x-y coordinates. Often, another bit is included to differentiate between ON and OFF events. The grayscale values are typically digital words representing the light received by each pixel and are typically accumulated into a frame of image data.

The sensor controller CN also controls a Vref controller/counter RC that also provides a counter output and a DAC-code to a reference voltage generator RG that generates the reference voltage Vref to the array EBPA. The counter output and the reference voltage Vref are produced by the ramp and counter circuit RC and are synchronized in time with each other. This means that there is an established relationship between the instantaneous counter output and the instantaneous voltage of the reference voltage. Often the reference voltage Vref takes the form of a voltage (linear or exponential) ramp over time, that ascends and/or descends in voltage, with the count of the counter tracking and digitally representing Vref.

It may be preferential if the count that is distributed to the pixel is a gray count because this makes the overall circuit more robust against glitches. In this case, a gray count converter GC2 and a gray count de-converter GC are needed. The gray count converter GC2 converts a normal binary number into a corresponding gray count. Gray counts have the property that from one state to the next, only one bit changes. The gray count de-converter converts the gray count back to a normal binary number.

Figure 2:
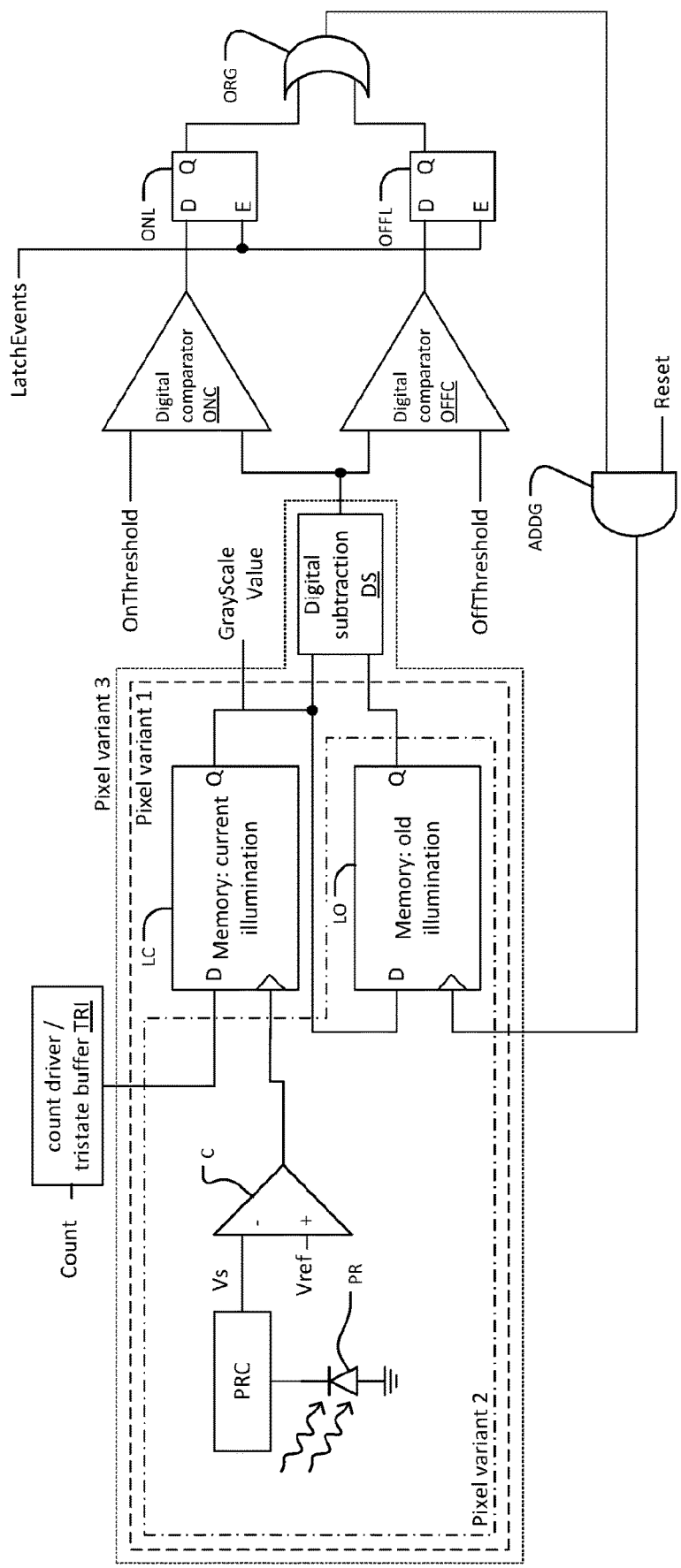
FIG. 2 is a circuit diagram of a digital pixel for an event-based pixel array and showing different arrangements for components between in-pixel or in-column locations, according to the invention.

FIG. 2 shows the general configuration of each of the pixels P along with other circuitry that would be resident in the readout circuit RO of the sensor.

In more detail, a photoreceptor PR and a photoreceptor circuit PRC are resident in each of the pixels. Together, they convert the incoming light L into a photoreceptor voltage Vs.

A comparator C of the pixel P compares the photoreceptor voltage Vs with the reference voltage Vref. This comparator may include some form of hysteresis to avoid problems due to bouncing comparator output.

Once the current analog level of the reference voltage Vref is equal to the photoreceptor output voltage Vs, the comparator C clocks a current illumination latch array LC to store the current counter value for the pixel, which is provided by the counter driver/tristate buffer TRI.

A digital subtractor DS calculates the difference between current illumination value stored in the current illumination latch array LC and the old illumination value stored in an old illumination latch array LO.

The difference value produced by the digital subtractor DS is then compared to two thresholds in an ON event digital comparator ONC and OFF event digital comparator OFFC, which respectively receive a digital ON event threshold OnThreshold and a digital OFF event threshold OffThreshold, which are typically dictated by the controller CN.

The outputs of the digital comparators ONC, OFFC are stored in respective output latches ONL, OFFL.

If the state of either of the ON event output latch ONL or the OFF event output latch OFFL indicates an event based on the OR logic gate ORG, the current illumination value is stored into the old illumination latch array LO in response to the reset signal becoming active (Reset) by operation of the AND logic gate ANDG.

There are a number of different variants for this architecture that are distinguished by what components are located within each pixel P and therefore replicated for each pixel across the entire array EBPA, from variants where those components are located in the readout circuit RO and thus shared by a pixel column. The basic tradeoff is that locating components within each pixel makes the entire sensor faster, but making the pixel more complex detrimentally impacts the array's size and sensor's fill factor.

Generally, the photosreceptor PR and a photoreceptor circuit (PRC) are always replicated in each pixel (Pixel variants 1-3). Further, the analog comparator C is also located in the pixel along with the current illumination latch array LC (Pixel variants 1 and 3). This ensures high speed operation and accurate storage of the current illumination value.

In one variant (Pixel variant 2), the current illumination latch array LO is located in the readout circuit RO along with the other downstream components such as the digital subtractor DS and ON event digital comparator ONC and OFF event digital comparator OFFC.

As a general rule, if the current illumination is stored not in the pixel, then the ADC conversion will be performed row-wise, so the ramps are required for every row. So the sensor will be considerably slower. Of course there are also intermediate solutions, for example four (4) pixels could share on current illumination memory, then ramps would only need to be generated four times. Generally, many old illumination memories are required as pixels.

However, in another variant, the old illumination latch array LO and possibly the digital subtractor DS, are located in each pixel (Pixel variant 3).

In addition, each pixel P also produces the grayscale value detected by the pixel. Thus, the sensor allows access to two types of information: the occurrence of an event (by outputting the addresses of pixels where the event has happened) and the new illumination value of the corresponding pixel.

The sensor is well suited for implementation in wafer stacking using pixel-level hybrid bonding. One to three wafer-to-wafer connections per pixel are needed. Specifically, the analog circuits are implemented on the upper wafer. This includes the photoreceptor and the comparator C. The downstream digital circuits are implemented in the lower wafer.

In other examples, any portions of analog circuits including PMOS transistors are implemented in the lower wafer. Thus, only NMOS transistors are in upper wafers. In common implementations of the amplifier/comparator, two or three PMOS transistors are needed. These can be implemented on a lower wafer. This needs two or three wafer-to-wafer connections per pixel depending on the implementation of the amplifier.

This allows selecting optimal process technology on the upper wafer for light sensitivity and analog circuits, and optimal process technology on the lower wafer for dense digital circuits.

Figure 3A:
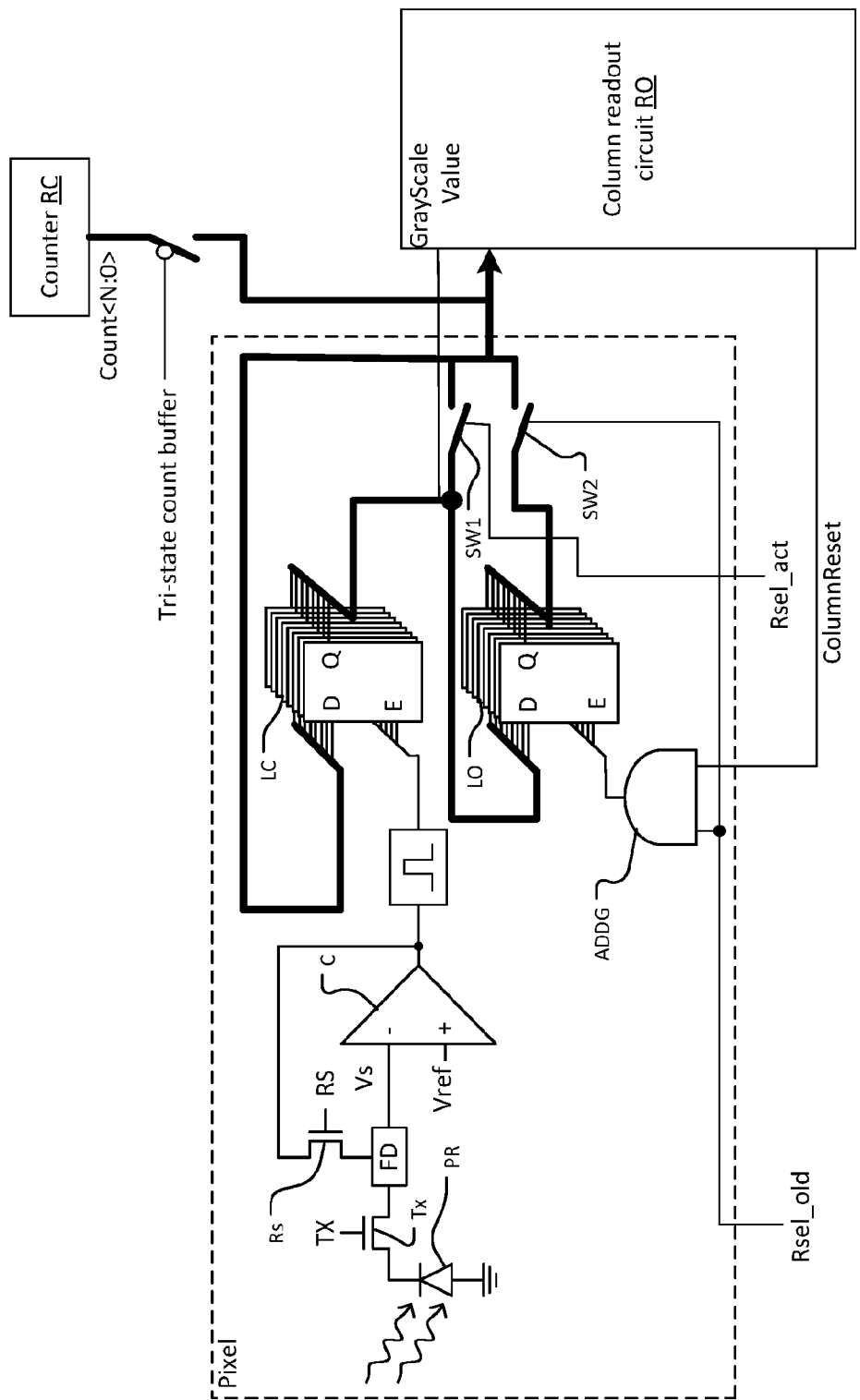
FIG. 3A is a more detailed circuit diagram of a digital pixel for an event-based pixel array, according to a first embodiment.

FIG. 3A is a circuit diagram of the pixels P according to a more specific embodiment that uses a level sensitive memory. Advantageously, ADC-conversion can happen globally and simultaneously for all pixels P of the EBPA. On the other hand, the digital subtraction and the comparators are in the column readout circuit in this embodiment.

Here, a conventional active pixel circuit (APS) front-end is employed. It includes a pinned photodiode PR and charge transfer transistor Tx controlled by a charge transfer signal TX, a floating diffusion FD and a reset transistor Rs controlled by a reset signal RS.

To achieve a high dynamic range, a double exposure scheme may be also used: After resetting, transistor TX samples voltage for a first time, and it is registered and read-out with a first slope, while PR continues to integrate. After the first readout, TX is sampled for a second time and all pixels that are not saturated are read out with an adapted slope.

The pixel P uses the same comparator C for readout/comparison by providing a feedback path from the output of the comparator C to its inverting input (−). Thus, a double sampling is inherently used to reduce pixel-to-pixel differences due to comparator offsets.

Also shown are the switches SW1, SW2 that are used to transfer the current illumination value from current latch array LC and the old illumination value from latch array LO to the column readout circuit RO in response to signal Rsel_act from the row scanner and drivers RS. Here signal Rsel_old used as the reset to trigger the writing of the current illumination value to the old illumination value latch array LO.

In general, readout and comparison happen row-wise here. One row is selected, and the content of both memories LC, LO are connected to the corresponding column readout RO.

Figure 3B:
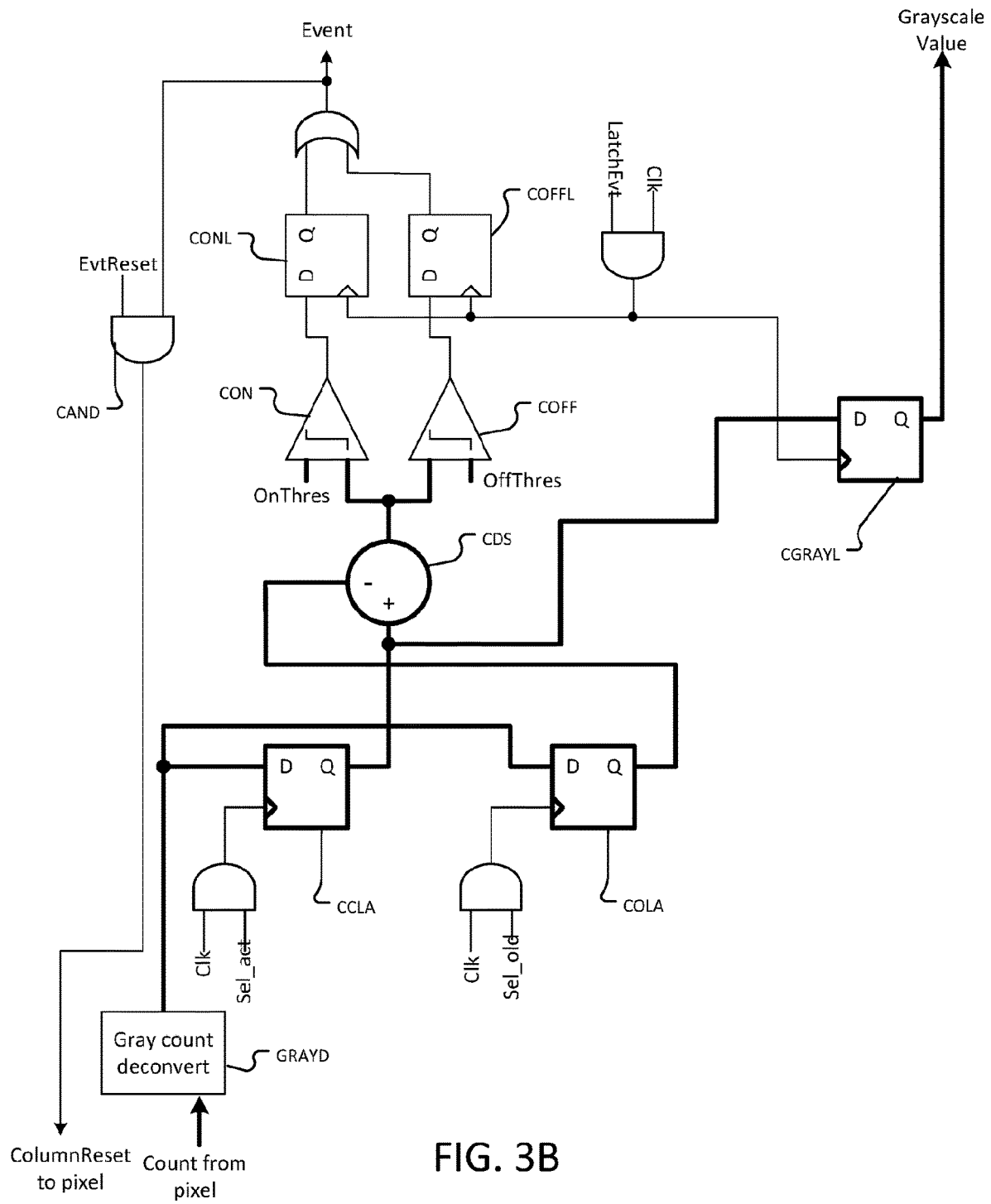
FIG. 3B is a circuit diagram of the column readout circuitry, according to a first embodiment.

FIG. 3B is a circuit diagram of the portion of the column readout circuit RO that supports a column of the pixels P as shown in FIG. 3A.

The current illumination value from the current latch array LC and the old illumination value from the old illumination latch array LO of the pixel of the selected row are received into a column current latch array CCLA and a column old illumination latch array COLA, respectively, of the column readout circuit RO. These latches are clocked based on Clk, Sel_act and Sel_old signals.

If a gray count is employed, for a simpler implementation of the digital subtraction CDS, the gray count de-converter (GC in FIG. 1, GRAYD in FIG. 3B) may be repeated for each column of pixels.

The values from the column current latch array CCLA and a column old illumination latch array COLA are provided to a column digital subtractor CDS. The output of the column digital subtractor CDS is provided to two digital comparators CON, COFF that discriminate ON events and OFF events based on the corresponding thresholds OnThres, OffThres. Column event output latches CONL, COFFL hold the results. These results are also used to reset the corresponding pixel via the column AND gate CAND based on EvtReset.

The current illumination value is also passed to a column grayscale latch array CGRAYL to provide the grayscale output.

Figure 3C:
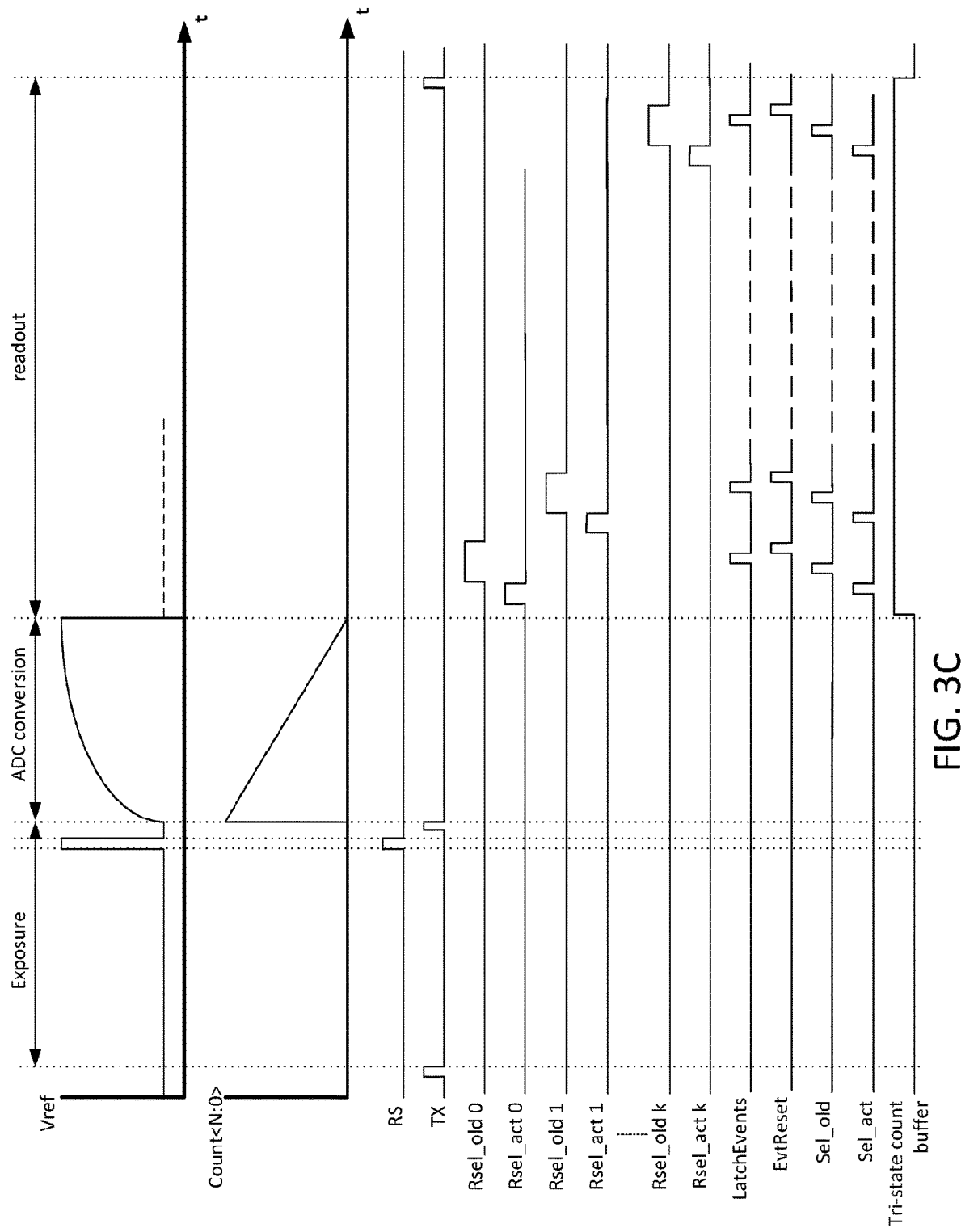
FIG. 3C is a timing diagram for a sensor employing the first embodiment digital pixel.

FIG. 3C is a timing diagram showing the signals over the exposure phase, ADC conversion phase and the readout phase for the pixel embodiment shown in FIG. 3A.

Figure 4A:
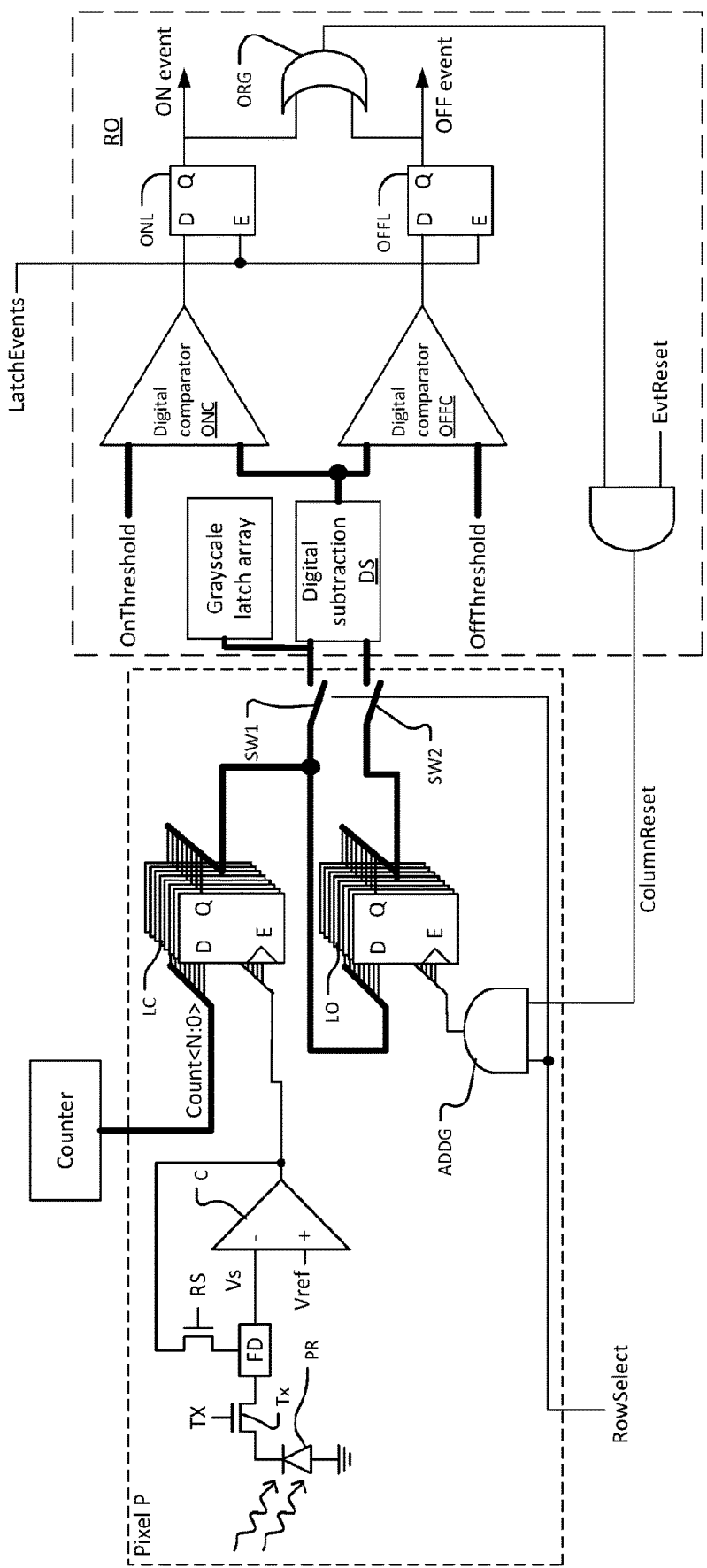
FIG. 4A is a circuit diagram of a digital pixel for an event-based pixel array, according to a second embodiment.

FIG. 4A is a circuit diagram of the pixels P according to another embodiment that uses an edge sensitive memory. An edge sensitive memory stores the value at the input at the rising edge of the clock signal, while level sensitive memory stores the input signal as long as the clock (or here called Enable E) signal is high.

Switches SW1, SW2 that are used to transfer the current illumination value from latch array LC and the old illumination value from latch array LO to the digital subtractor DS in the column readout circuit RO in response to signal RowSelect signal are under the control of the sensor controller CN.

Figure 4B:
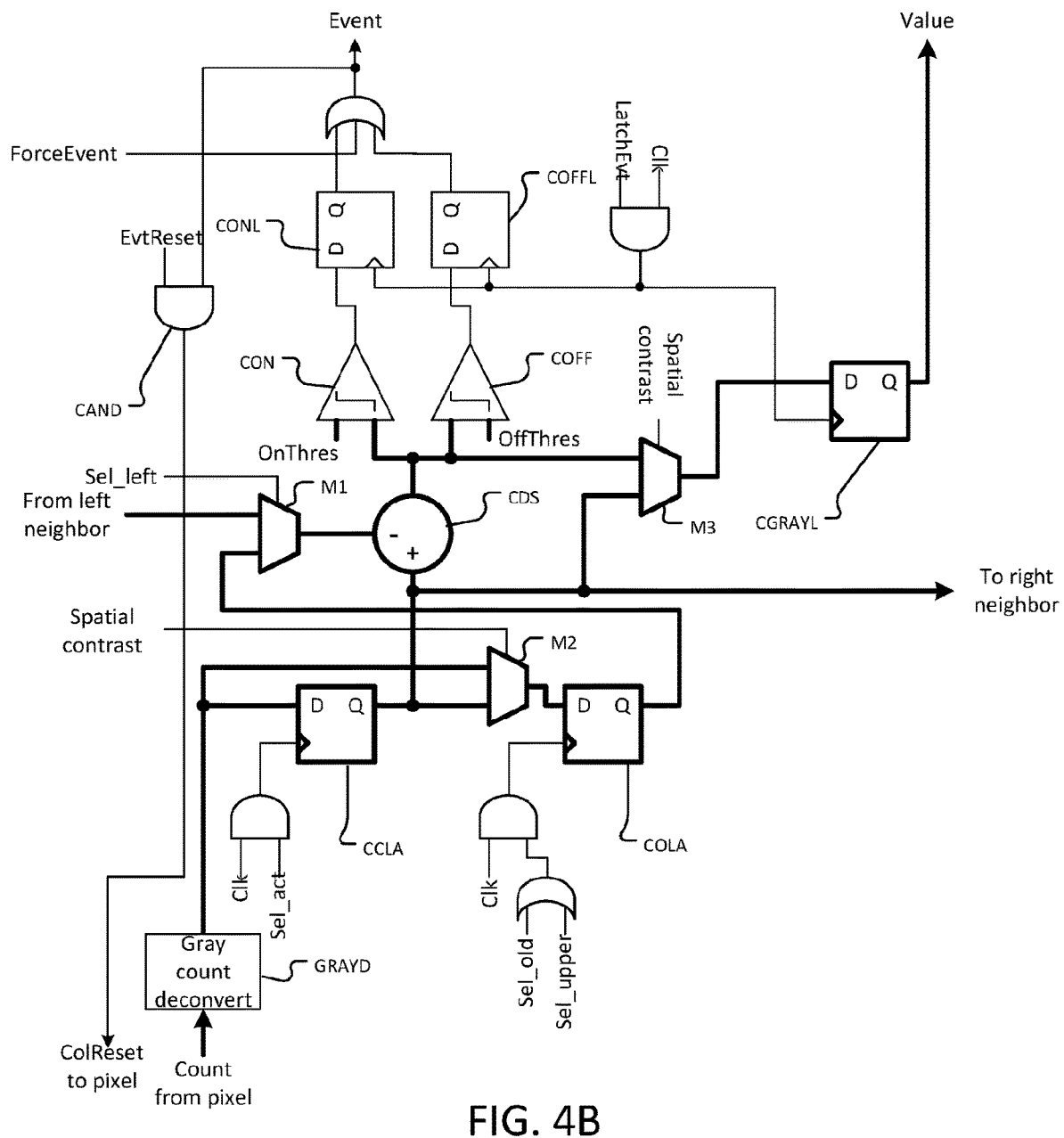
FIG. 4B is a circuit diagram of the column readout circuitry, according to a second embodiment.

FIG. 4B is a circuit diagram of the portion of the column readout circuit RO that supports a column of the pixels P as shown in FIG. 4A.

This example additionally provides for the assessment of spatial contrast. A series of column multiplexors M1, M2, M3 provide a spatial contrast operating mode in which the current illumination value stored in the column current latch array is compared to the current illumination value of a neighboring pixel to the left based on the state of the signal Spatial contrast. In this mode, the spatial contrast output value from the column digital subtractor CDS is then provided to the column gray scale latch CGRAYL. When not in spatial contrast mode, the operation is similar to that as described in connection with FIG. 3A.

Figure 4C:
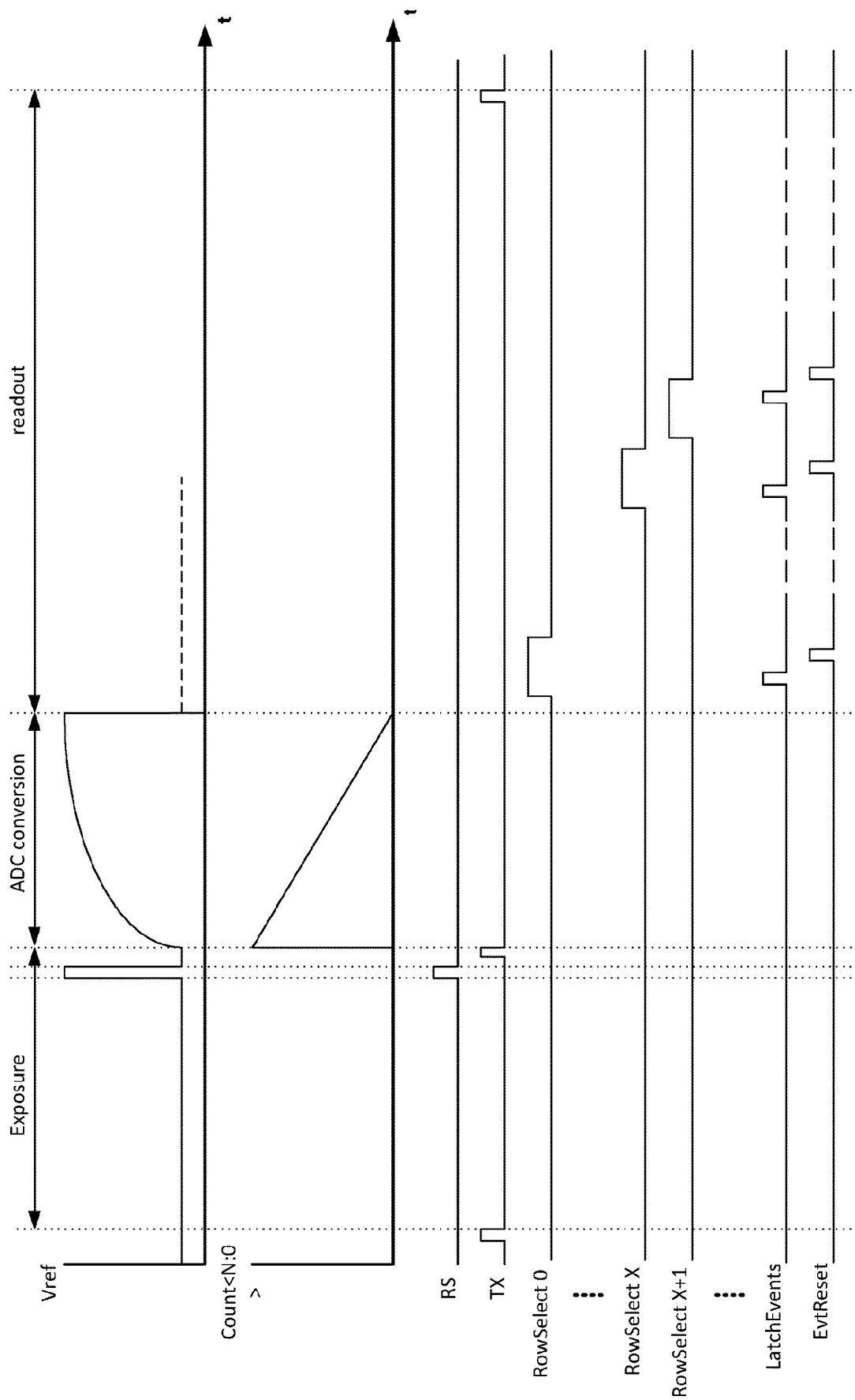
FIG. 4C is a timing diagram for a sensor employing the second embodiment digital pixel.

FIG. 4C is a timing diagram showing the signals over the exposure phase, ADC conversion phase and the readout phase for the embodiment shown in FIG. 4A.

Figure 5:
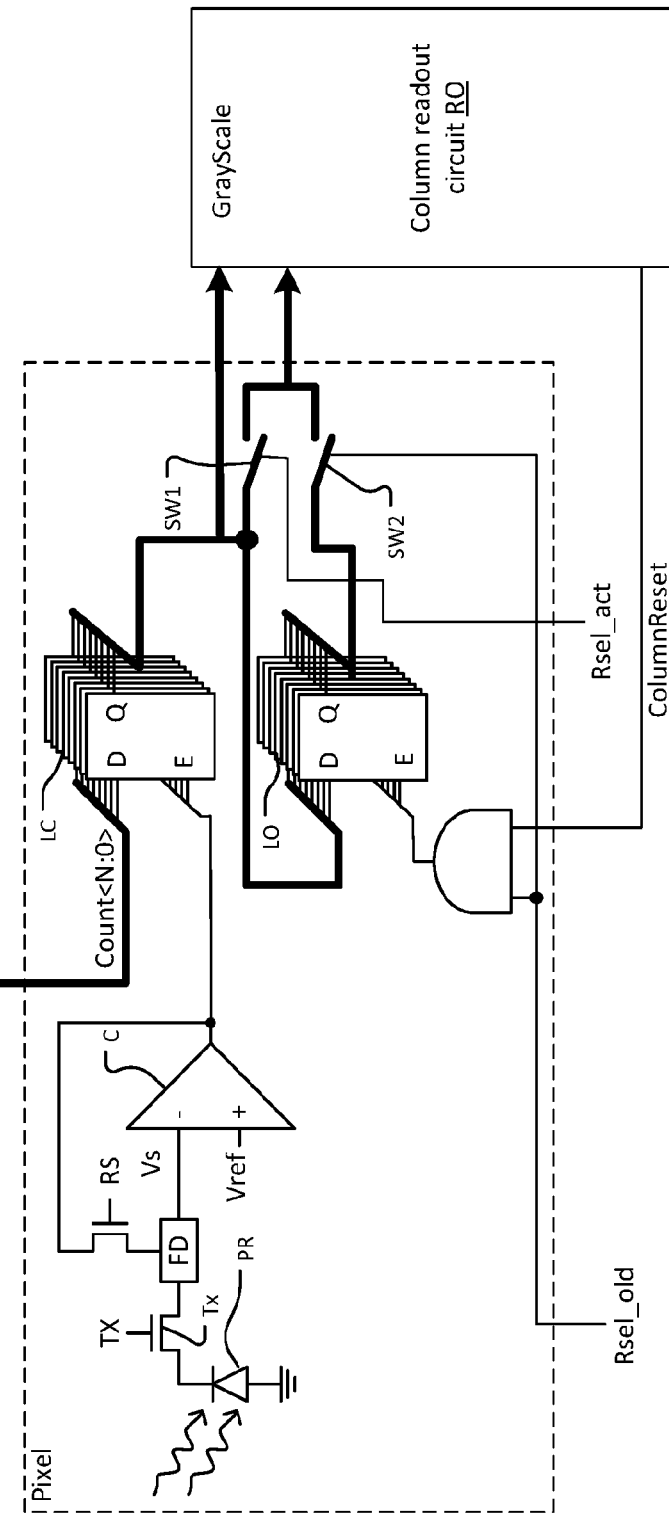
FIG. 5 is a circuit diagram of a digital pixel for an event-based pixel array, according to a third embodiment.

FIG. 5 is a circuit diagram of the pixels P according to another embodiment that uses a level sensitive memory.

Here, the reference voltage Vref needs to ramp down. The output of comparator C is high until Vref crosses Vs, and at this point the enable signal to the current illumination latch array LC goes down.

In general, this embodiment is more compact than that discussed with reference to FIG. 4A, but has higher power consumption because memory is toggling until Vref is crossed.

Figure 6A:
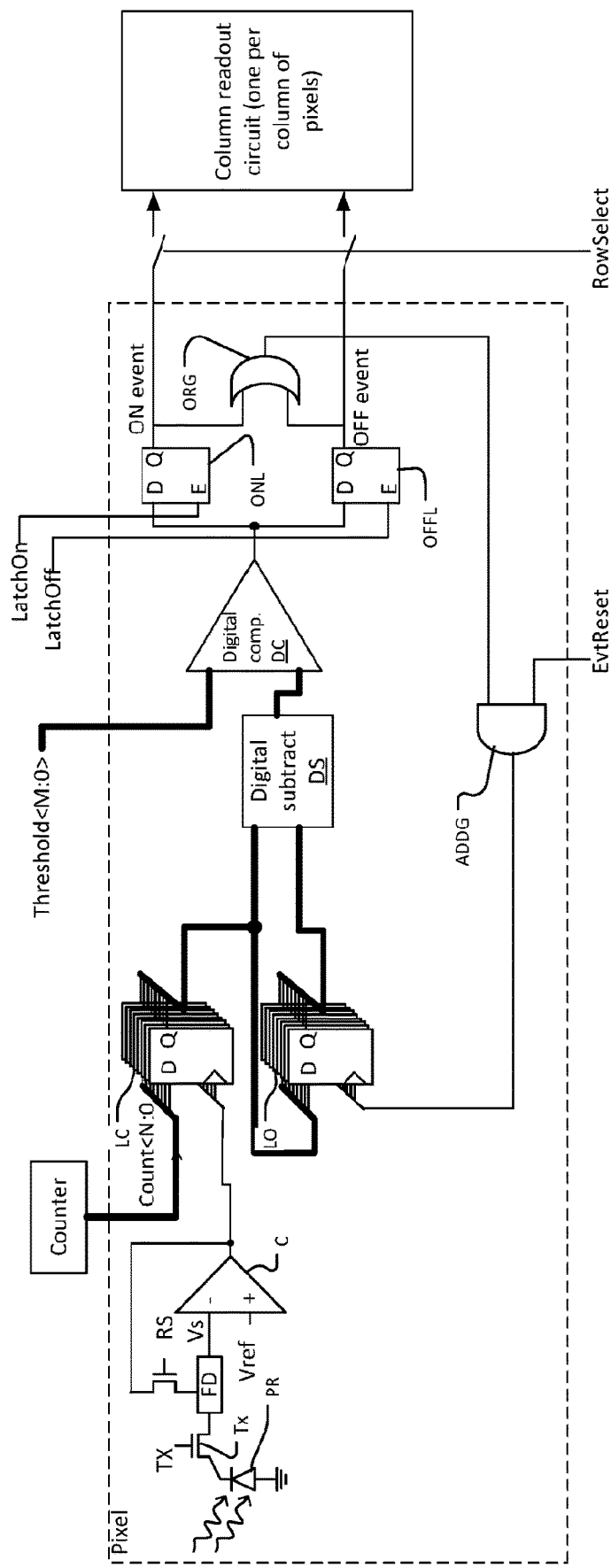
FIG. 6A is a circuit diagram of a digital pixel for an event-based pixel array, according to a fourth embodiment.

FIG. 6A is a circuit diagram of the pixels P according to another embodiment. In this embodiment, the digital subtraction circuit DS as well as one digital comparator DC are located in each pixel.

Here, the ON event output latch ONL and OFF event output latch OFFL are implemented in each pixel and only provide their results to the column readout circuit RO in response to the RowSelect from the controller CN.

Figure 6B:
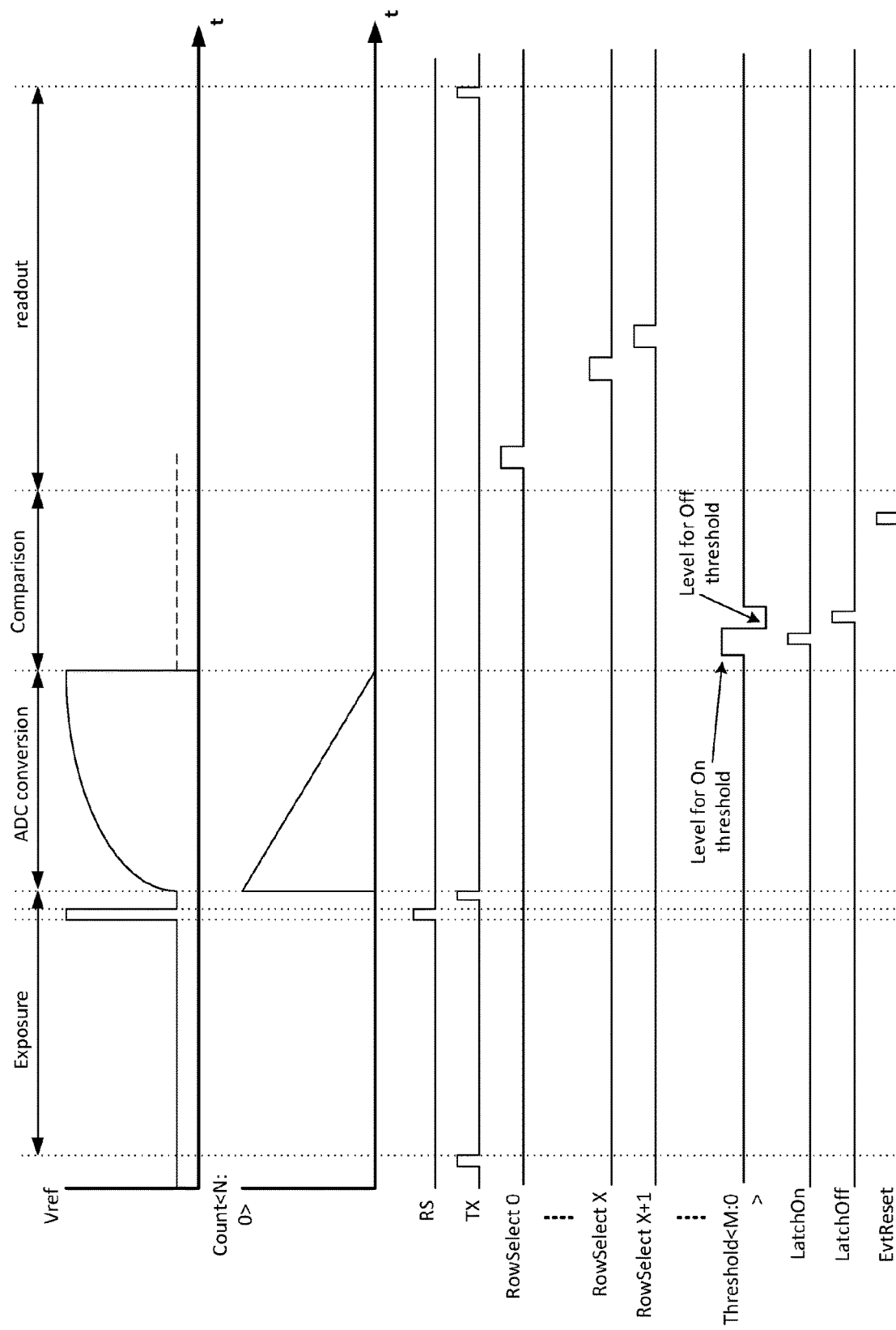
FIG. 6B is a timing diagram for a sensor employing the fourth embodiment digital pixel.

FIG. 6B is a timing diagram showing the signals over the exposure phase, ADC conversion phase and the readout phase for the embodiment shown in FIG. 6A.

FIGS. 7A and 7B show two alternative front end circuits that could be used in place of the previous examples.

These frontend circuits will reduce pixel to pixel offsets and generate an acceptable grayscale output even with logarithmic front-end. Moreover, a double-sampling scheme may be used. And, both examples allow a differential double sampling so that the resulting gray scale value should have small offset.

In more detail, FIG. 7A shows a log feedback arrangement wherein the output of the comparator C is feedback through a switch SW3 controlled by the Reset signal. The feedback is received in an amplifier arrangement producing FOut to the comparator C. The amplifier comprises transistors T1, T2, T3, T4, where transistor T2 is also controlled by the Reset signal and transistor T3 is controlled by a bias voltage signal.

In more detail, FIG. 7B shows a photovoltaic feedback arrangement wherein the output of the comparator C is feedback through switch SW3 controlled by the Reset signal. The feedback is received in an amplifier arrangement producing FOut to the comparator C. The amplifier comprises transistors T5, and T7. Transistor T6 is also controlled by the Reset signal.

Figure 8A:
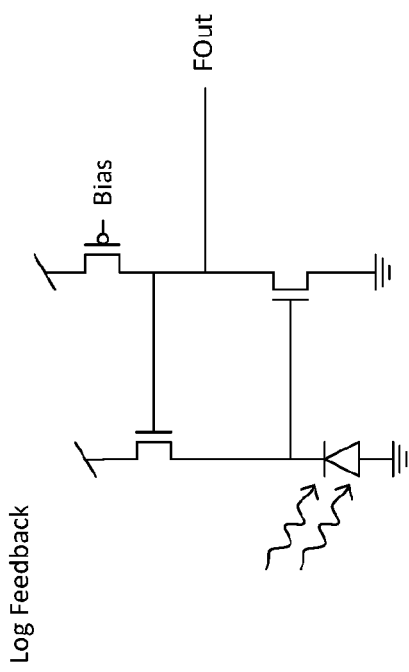
FIG. 8A is a circuit diagram third pixel front end.
Figure 8B:
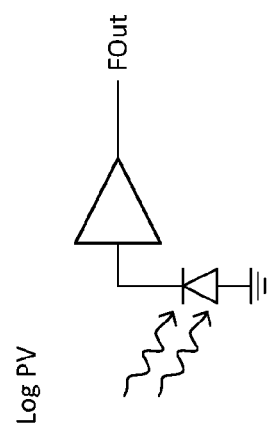
FIG. 8B is a circuit diagram for a fourth pixel front end using a photovoltaic configuration.

FIGS. 8A and 8B show two alternative front end circuits that could be used in place of the previous examples of FIGS. 7A and 7B to produce the FOut signal to the comparator C.

As shown, the frontend may also be implemented using logarithmic frontends which results in increased noise due to the absence of double sampling schemes, mismatch and continuous time operation. If a front-end with logarithmic light to voltage mapping is used, then Vref ramp and counter output should be both linear.

In general, the bit width of the counter RC and the bit width of the digital comparators ONC, OFFC (and thus the threshold signal) do not necessarily need to be the same. For the comparator, a smaller bit width may be chosen. This will result in a maximal threshold that can be set. The subtraction circuit needs then to be implemented such that the output bit width is smaller than the input bit width, along with an "overflow" bit that shows that the difference is larger than what can be coded with the number of bits of the output of the subtraction circuit.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical sensor comprising:
    pixels including photoreceptors for detecting received light, and analog comparators for comparing signals from the photoreceptors to a ramp voltage;
    current memories for storing current counts that are related to the ramp voltage;
    old memories for storing previous counts;
    one or more digital comparators for comparing a difference between the current counts and the previous counts to at least one event threshold; and
    ON and OFF event digital comparators for comparing a difference between the current counts and the previous counts to an ON event threshold and an OFF event threshold.

2. The sensor of claim 1, wherein at least some of the memories are located in each pixel.

3. The sensor of claim 1, wherein each pixel contains an old memory for storing previous counts.

4. The sensor of claim 1, wherein each pixel contains a current memory for storing current counts.

5. The sensor of claim 1, further comprising digital subtractors for determining a difference between the current counts and the previous counts.

6. The sensor of claim 1, wherein ramp voltage varies exponentially over time.

7. An optical sensor comprising:
    pixels including photoreceptors for detecting received light, and analog comparators for comparing signals from the photoreceptors to a ramp voltage;
    current memories for storing current counts that are related to the ramp voltage;
    old memories for storing previous counts; and
    one or more digital comparators for comparing a difference between the current counts and the previous counts to at least one event threshold;
    wherein the photoreceptors and at least part of the analog comparators are implemented in a different wafer from the current memory and the old memory.

8. The sensor of claim 7, further comprising ON and OFF event digital comparators for comparing a difference between the current counts and the previous counts to an ON event threshold and an OFF event threshold.

9. An optical sensor comprising:
    pixels including photoreceptors for detecting received light, and analog comparators for comparing signals from the photoreceptors to a ramp voltage;
    current memories for storing current counts that are related to the ramp voltage;
    old memories for storing previous counts;
    one or more digital comparators for comparing a difference between the current counts and the previous counts to at least one event threshold; and
    digital subtractors for determining a difference between the current counts and the previous counts, wherein the digital subtractors are located in each pixel.

10. An optical sensor comprising:
    pixels including photoreceptors for detecting received light, and analog comparators for comparing signals from the photoreceptors to a ramp voltage;
    current memories for storing current counts that are related to the ramp voltage;
    old memories for storing previous counts;
    one or more digital comparators for comparing a difference between the current counts and the previous counts to at least one event threshold; and
    digital subtractors for determining a difference between the current counts and the previous counts, wherein the digital subtractors are located in readout circuits and shared between a subset of pixels.

11. An optical sensing method for an optical sensor, comprising:
    detecting received light and comparing resulting signals to a ramp voltage in pixels of the optical sensor;
    storing current counts that are related to the ramp voltage;
    storing previous counts;
    comparing a difference between the current counts and the previous counts to at least one event threshold; and
    comparing a difference between the current counts and the previous counts to an ON event threshold and an OFF event threshold.

12. The method of claim 11, wherein memories are for storing the current counts and/or the previous counts are located in each pixel.

13. The method of claim 11, further comprising digitally subtracting the current counts and the previous counts.

14. The method of claim 11, wherein ramp voltage varies exponentially over time.

15. The method of claim 13, wherein the digital subtraction is performed in columns.

16. An optical sensing method for an optical sensor, comprising:
  detecting received light and comparing resulting signals to a ramp voltage in pixels of the optical sensor;
  storing current counts that are related to the ramp voltage;
  storing previous counts; and
  comparing a difference between the current counts and the previous counts to at least one event threshold in a different wafer than the light detection.

17. The method of claim 16, further comprising comparing a difference between the current counts and the previous counts to an ON event threshold and an OFF event threshold.

18. An optical sensing method for an optical sensor, comprising:
  detecting received light and comparing resulting signals to a ramp voltage in pixels of the optical sensor;
  storing current counts that are related to the ramp voltage;
  storing previous counts; and
  comparing a difference between the current counts and the previous counts to at least one event threshold; and
  digitally subtracting the current counts and the previous counts, wherein the digital subtraction is performed in each pixel.

* * * * *